(12) United States Patent
Hu et al.

(10) Patent No.: US 11,645,906 B2
(45) Date of Patent: May 9, 2023

(54) NAVIGATION SYSTEM WITH TRAFFIC STATE DETECTION MECHANISM AND METHOD OF OPERATION THEREOF

(71) Applicant: TeleNav, Inc., Santa Clara, CA (US)

(72) Inventors: Lina Hu, Shanghai (CN); Hui Fang, Shanghai (CN); Congmin Bai, Shanghai (CN)

(73) Assignee: Tetenav, Inc., Santa Clara, CA (US)

(*) Notice: Subject to any disclaimer, the term of this patent is extended or adjusted under 35 U.S.C. 154(b) by 0 days.

(21) Appl. No.: 17/244,570

(22) Filed: Apr. 29, 2021

(65) Prior Publication Data
US 2022/0351613 A1 Nov. 3, 2022

(51) Int. Cl.
*G08G 1/08* (2006.01)
*G08G 1/01* (2006.01)
*G08G 1/052* (2006.01)
*G08G 1/0962* (2006.01)

(52) U.S. Cl.
CPC ......... *G08G 1/0133* (2013.01); *G08G 1/0112* (2013.01); *G08G 1/052* (2013.01); *G08G 1/09626* (2013.01)

(58) Field of Classification Search
CPC .... G08G 1/0133; G08G 1/0112; G08G 1/052; G08G 1/09626
See application file for complete search history.

(56) References Cited

U.S. PATENT DOCUMENTS

| | | | |
|---|---|---|---|
| 9,286,793 | B2 | 3/2016 | Pan et al. |
| 10,650,676 | B2 | 5/2020 | Bhat et al. |
| 10,821,976 | B2 | 11/2020 | Devi |
| 2014/0114556 | A1 | 4/2014 | Pan et al. |
| 2017/0069203 | A1 | 3/2017 | Sharma |
| 2018/0124319 | A1 | 5/2018 | Jo |
| 2019/0213880 | A1 | 7/2019 | Bhat et al. |
| 2019/0228649 | A1* | 7/2019 | Xu .......................... G08G 1/093 |
| 2019/0311612 | A1 | 10/2019 | Johnson et al. |
| 2020/0284607 | A1 | 9/2020 | Mangal et al. |
| 2020/0338983 | A1 | 10/2020 | Alalao |

FOREIGN PATENT DOCUMENTS

| | | | | |
|---|---|---|---|---|
| CN | 101710448 | * | 12/2009 | ............... G08G 1/01 |
| CN | 203260191 | * | 3/2013 | ............... G08G 1/00 |
| CN | 109658688 | A | 4/2019 | |
| CN | 110033479 | A | 7/2019 | |
| CN | 110248861 | A | 9/2019 | |

* cited by examiner

*Primary Examiner* — Hongmin Fan
(74) *Attorney, Agent, or Firm* — Perspectives Law Group, Corp.

(57) ABSTRACT

A navigation system includes: a control circuit configured to: generate a video clip by parsing an interval of a sensor data stream for a region of travel; analyze the video clip submitted to a deep learning model, already trained, including identifying a traffic flow estimate; access a position coordinate for calculating a distance to intersection; generate a traffic flow state by fusing a corrected speed, the traffic flow estimate, and the distance to intersection; merge a vehicle maneuvering instruction into the traffic flow state for maneuvering through the region of travel; and a communication circuit, coupled to the control circuit, configured to: communicate the traffic flow state for displaying on a device.

20 Claims, 7 Drawing Sheets

NAVIGATION SYSTEM WITH TRAFFIC STATE DETECTION MECHANISM AND METHOD OF OPERATION THEREOF

TECHNICAL FIELD

An embodiment of the present invention relates generally to a navigation system, and more particularly to a system with a traffic state detection mechanism.

BACKGROUND ART

Historically major metropolitan areas are characterized by their traffic jams. While traffic jams were limited to bracket start of work, lunch, and end of the work day that has now changed. In cities like Soule, Tokyo, Paris, London, New York, and Los Angeles, the traffic jam never ends. This results in a loss of resources and productivity due to time wasted and fuel consumed. The increase in the number of cars has spread the traffic congestion far beyond the city limits and into the suburbs. The current traffic monitoring systems are based on monitoring the speed of vehicles detected by electro-magnetic sensors embedded in high traffic highways, but are not in use on city streets.

As the number of vehicles on the roads increases, relying on route planning based on the speed detected on highways that can change in an instant becomes unreliable. Some attempts to monitor traffic flow have tapped into the automotive telematics system for speed detection, but the vehicles driving speed might not reflect the actual traffic flow. If a vehicle is mechanically impaired, due to engine trouble or a tire losing pressure, the traffic flow could be drastically misinterpreted.

Thus, a need still remains for a navigation system with a traffic state detection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: generating a video clip by parsing an interval of a sensor data stream for a region of travel; analyzing the video clip submitted to a deep learning model, already trained, including identifying a traffic flow estimate; accessing a position coordinate for calculating a distance to intersection; generating a traffic flow state by fusing a corrected speed, the traffic flow estimate, and distance to intersection; merging a vehicle maneuvering instruction into the traffic flow state for maneuvering through the region of travel; and communicating the traffic flow state for displaying on a device.

An embodiment of the present invention provides a navigation system, including a control circuit configured to: generate a video clip by parsing an interval of a sensor data stream for a region of travel; analyze the video clip submitted to a deep learning model, already trained, including identifying a traffic flow estimate; access position coordinates for calculating a distance to intersection; generate a traffic flow state by fusing a corrected speed, the traffic flow estimate, and the distance to intersection; merge a vehicle maneuvering instruction into the traffic flow state for maneuvering through the region of travel; and a communication circuit, coupled to the control circuit, configured to: communicate the traffic flow state for displaying on a device.

An embodiment of the present invention provides a non-transitory computer readable medium including instructions for a navigation system, including: generating a video clip by parsing an interval of a sensor data stream for a region of travel; analyzing the video clip submitted to a deep learning model, already trained, including identifying a lane line and a vehicle; accessing a position coordinate for calculating a real-world coordinate; generating a traffic flow state by fusing a corrected speed, a traffic view, and the real-world coordinate; merging a vehicle maneuvering instruction into the traffic flow state for maneuvering through the region of travel; and communicating the traffic flow state for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
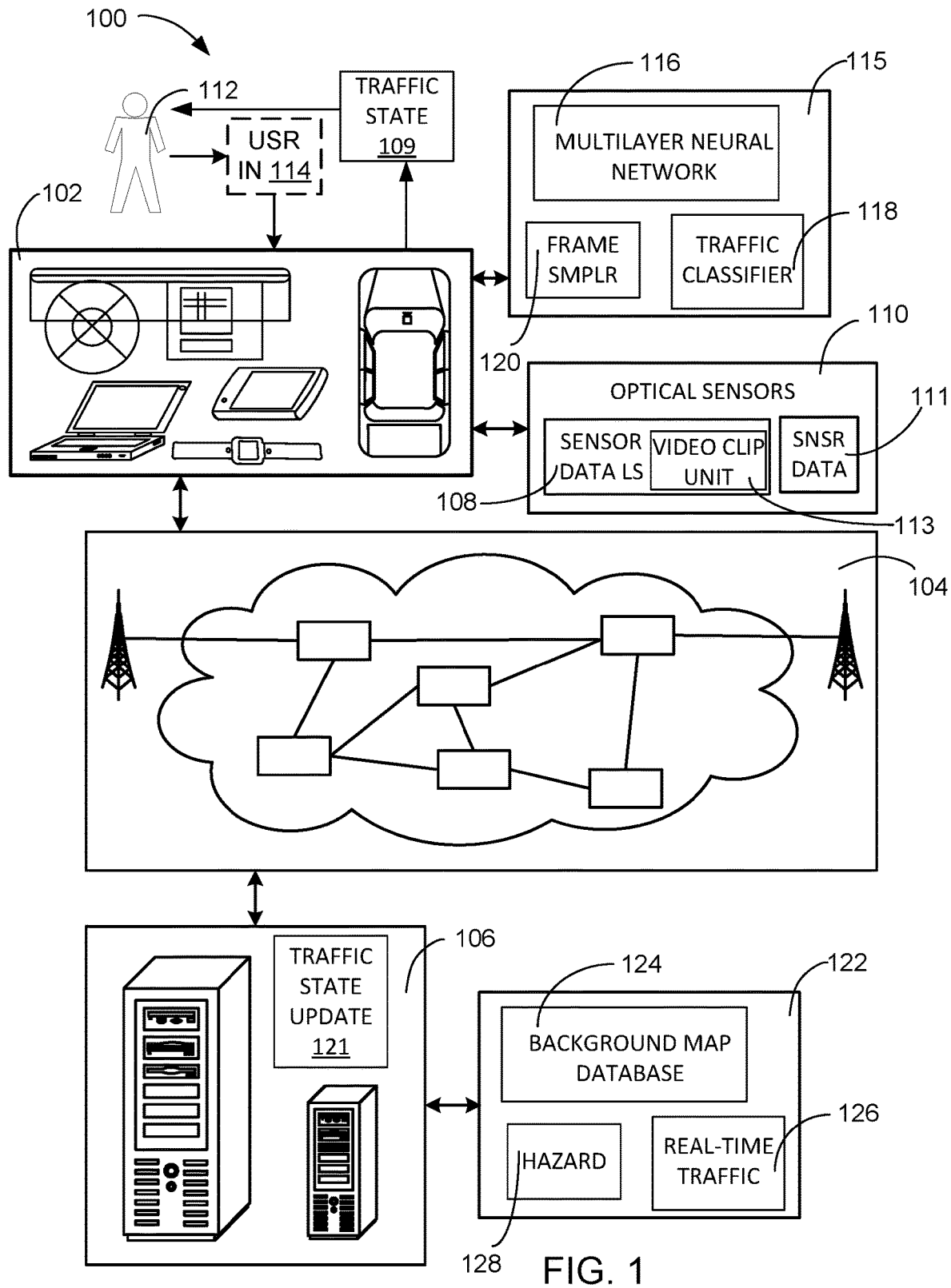
FIG. 1 is a block diagram of a navigation system with a traffic state detection mechanism in an embodiment of the present invention.

The following embodiments can accurately identify lanes and objects, which enables vehicle movement control for operating or controlling physical movement of a vehicle. The vehicle movement control can be based on a driver assisted or an autonomous vehicle driving process that is safe and reliable due to the accuracy of the lane and object detection.

The vehicle movement control can further be based on accurately identifying traffic conditions on a real-time basis in order to assure the driver assisted or autonomous vehicle can be completed without risk of damage to the vehicle or any adjacent objects or property.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z); where X and Y and Z are three coordinates that define the geographic location, i.e., a position of a vehicle.

The term "module" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" is written in the system claims section below, the "unit" is deemed to include hardware circuitry for the purposes and the scope of the system claims.

The units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

The term "fuse" or "fusing" as used in the specification and the claims have the meaning of combining, concatenating, merging, or integrating as appropriate for the usage of the term.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown a block diagram of a navigation system 100 with a traffic state detection mechanism in an embodiment of the present invention. The navigation system 100 can include a first device 102, such as a client or a server, connected to a second device 106, such as a client or server.

The navigation system 100 can include a system for identifying a traffic state based on fusion of multiple sources to reconcile and quickly identify the current traffic state to assist in making lane change or route change decisions. The first device 102 can communicate with the second device 106 through a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional device. Also, for example, the first device 102 can include a device or a sub-system, an autonomous or self-maneuvering vehicle or object, a driver assisted vehicle, a remote-controlled vehicle or object, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, or motorcycle.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the navigation system 100 is described with the second device 106 as a computing device, although it is understood that the second device 106 can be different types of devices. Also, for illustrative purposes, the navigation system 100 is shown with the second device 106 and the first device 102 as endpoints of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can provide additional features that are not available in prior art navigation systems. The first device 102 can be coupled to optical sensors 110 and a sensor data local storage 108. The optical sensors 110 are sensors, such as a set of monocular cameras positioned on the first device 102, configured to monitor, observe, record, or a combination thereof the surroundings of the first device 102. The sensor data local storage 108 provides a non-transitory storage medium including a video clip unit 113 to store data captured by the optical sensors 110. The video clip unit 113 can include two banks of the memory, in the sensor data local storage 108, capable of storing clips of a fixed length, such as 3 seconds, of captured video frames in succession. One of the clips can be stored and processed, while the next clip is loaded into memory. Once processed, the clips can be serially added to the sensor data local storage 108.

For example, the sensor data local storage 108 can be implemented in a number of ways, such as a non-volatile storage device, such as a hard disk drive, a solid state storage device (SSD), a FLASH memory card, or a combination thereof, capable of parsing a sensor data stream into limited length segments, such as 3 second segments.

The first device 102 can be coupled to a traffic estimation module 115, such as a pixel evaluation module, that can be implemented in software running of specialized hardware, full hardware, or a combination thereof configured to analyze a photographic scene to identify vehicular traffic in front of and around the first device 102. The traffic estimation module 115 can parse a sensor data stream 111, including sampled frames of video data, in order to identify an estimated traffic state for the scene captured by the optical sensors 110. During a training process, the first device 102 can upload the sensor data stream 111 to the second device 106 for further analysis or to generate an updated version of the multilayer neural network 116 to improve the detection of the estimated traffic state for the traffic state detection.

The traffic estimation module 115 can include a multilayer neural network 116, a traffic classifier module 118, and a frame sampler module 120 that can generate an estimation of a traffic flow state 109. The multilayer neural network 116 can be a software or hardware module capable of performing matrix mathematics on the input sampled frames of the scan data within the sensor data stream 111 in order to identify the estimated traffic state detected by the optical sensors 110.

The traffic classifier module 118 can be software or hardware module capable of determining the presence of vehicles based on the grouping of sampled frames passed to the multilayer neural network 116, which can be stored in the first device 102 or the second device 106. The traffic classifier module 118 can receive input from the multi-layer neural network 116, which has a strong ability to extract complex features from the sampled frames. The sensor data stream 111 can be analyzed by submitting the scan data portion of the sensor data stream 111 to the multilayer neural network 116. It is understood that other portions of the sensor data stream 111 including time, real world position, and extrinsic parameters of the optical sensor 110 can be stored in the first device 102 or the second device 106 for subsequent operations.

The frame sampler module 120 can be software or hardware module capable of selecting samples of the frames presented by the sensor data stream 111. The frame sampler module 120 can include an updatable set of parameters for identifying how many and which of the sampled frames are presented to the multilayer neural network 116. The results of the analysis of the frame sampler module 120 can be stored in the storage circuitry of the first device 102 or the second device 106. It is understood that the frame sampler module 120 can change the sampling strategy when some fluctuations occur in the sensor data stream 111 representing different scenarios.

The traffic classifier module 118 can output the estimate of the traffic flow state 109 including a reference designator provided by the first device 102 indicating whether the analyzed frames represent a congested state, a slow state, or a free traffic state. The traffic flow state 109 can provide the vehicle with maneuvering instructions to increase speed, decrease speed, change lanes, or change position within a lane.

The sensor data local storage 108 can be coupled to the optical sensors 110 in order to store a sensor data stream 111 and adjustments to the multilayer neural network 116 returned from the second device 106 during a training period. The first device 102 can assemble frames for the optical sensors 110 to generate the sensor data stream 111 for analysis. The sensor data stream 111 can provide the information captured by the optical sensors 110 and recorded in the sensor data local storage 108. The first device 102 can transmit a traffic state update 121 over the network 104 to the second device 106. The traffic state update 121 can be a compilation of the traffic flow state 109, determined by the first device 102, over a fixed period of time, such as one minute. The second device 106 can distribute the traffic state update 121 to other users that are approaching the location identified in the traffic state update 121 in order for them to make adjustments to avoid potential hazards.

The navigation system 100 can be operated by a user 112. The user 112 can include a person or an entity accessing or utilizing the navigation system 100 or a device therein. For example, the user 112 can include a person owning or operating the first device 102, a service, or a combination thereof. Also, for example, the user 112 can access or utilize the second device 106 through the first device 102, a service, or a combination thereof.

The navigation system 100 can further process a direct user input 114 from the user 112. The direct user input 114 can include a request for navigation assistance, location of a point of interest, parking assistance, restaurant assistance, lodging assistance, location of gas stations, event reservations, or a combination thereof. The direct user input 114 can be provided by or from the user 112 directly to or directly on the first device 102. The direct user input 114 can include the input or the stimulus directly for or related to corresponding software, application, feature, or a combination thereof.

The navigation system 100 can implement one or more embodiments without the direct user input 114. The navigation system 100 can further implement one or more embodiments using the direct user input 114 unrelated thereto. The direct user input 114 can include an increase in speed, a decrease in speed, a change of position within a lane, or changing lanes as prompted by the user 112.

The second device 106 can receive the traffic state update 121 periodically from the first device 102 or when requesting service for route planning or identification or points-of-interest along the current roadway. The second device 106 can distribute the traffic state update 121 to other users approaching the location identified by the traffic state update 121 from the first device 102.

The second device 106 can analyze the traffic state update 121 and generate refinements to the multilayer neural network 116 for use by the first device 102 during a training process. By way of an example, the second device 106 can apply the traffic state update 121 to a map activity manager 122. The map activity manager 122 can parse the traffic state update 121 in order to update a background map database 124, a real-time traffic model 126, and a hazardous warning model 128. The background map database 124 can include a pictorial display of the roads, highways, and intersections for a given region. The real-time traffic model 126 can apply the traffic state update 121 received from the first device 102 to the background map database 124 in order to convey current road conditions to other users of the navigation system 100. The hazardous warning model 128 can apply the traffic state update 121 to the background map database 124 to indicate areas that represent dangerous conditions, including traffic accidents, heavy congestion, road construction, low speed traffic, excessive speed traffic, or situations that increase the risk of an accident.

It has been discovered that the navigation system 100 can reliably identify the traffic flow state 109 in order to provide real-time updates of the traffic conditions for the first device 102. The traffic flow state 109 can be normalized over a fixed period of time in order to produce the traffic state update 121. By sending the traffic state update 121 to the second device 106, a communication can be distributed to other users of the navigation system 100 for route planning, traffic or accident warnings, lane selection alerts, construction warnings, and the like. The navigation system 100 can improve safety of the first device 102 by providing real-time traffic updates, lane suggestions, alternate routes, or a combination thereof.

Figure 2:
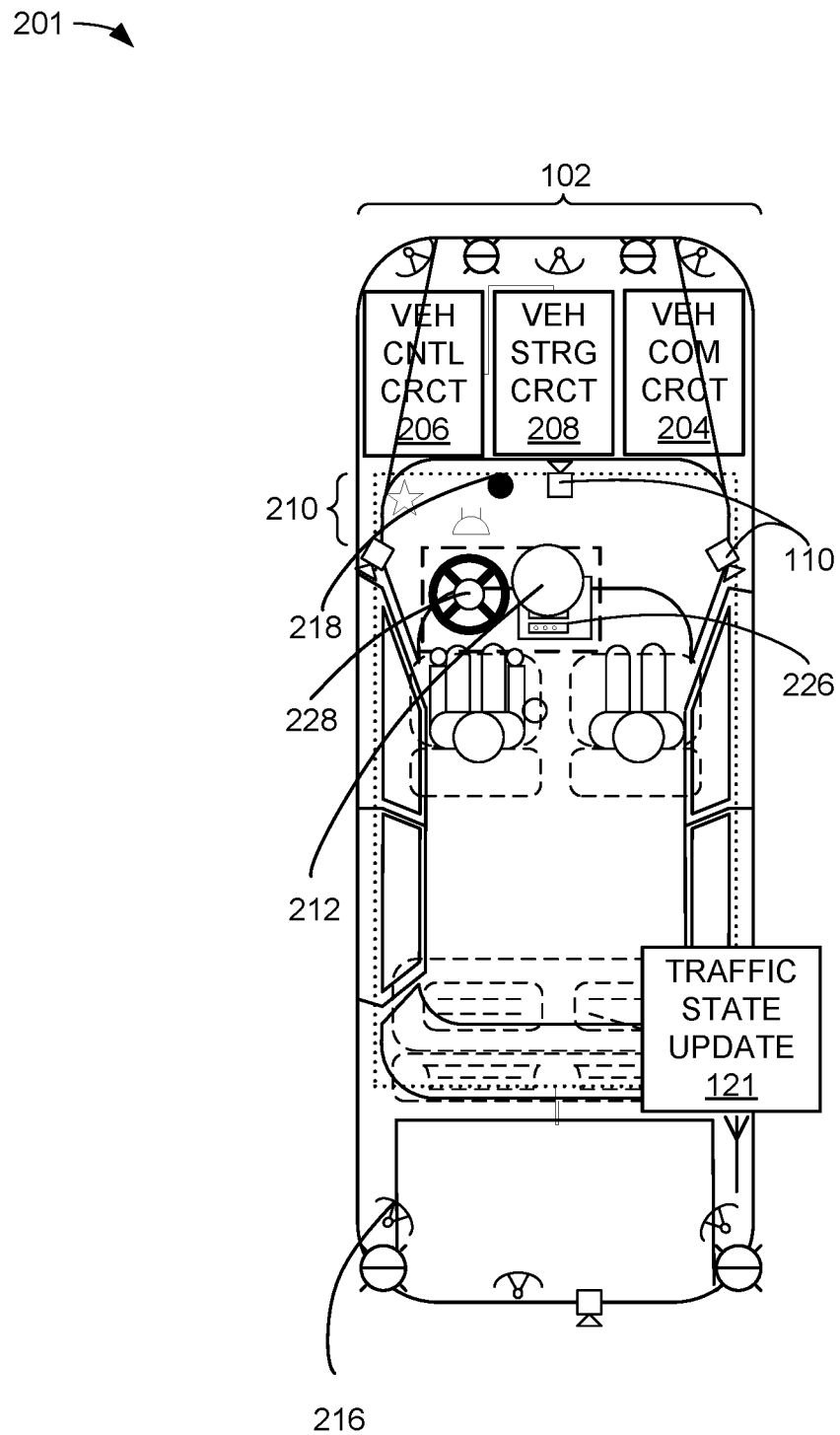
FIG. 2 is an example of a top view of a first device configured to provide the traffic state detection mechanism in an embodiment.

Referring now to FIG. 2, therein is shown an example a top plan view illustration of a vehicle for the navigation system 100 of FIG. 1. The navigation system 100 can include or interact with the first device 102.

The first device 102 can be an object or a machine used for transporting people or goods capable of automatically maneuvering or operating the object or the machine. The first device 102 can include vehicles accessible by the user 112 of FIG. 1 for control, maneuver, operation, or a combination thereof. For example, the first device 102 can include a car, a truck, a cart, a drone, or a combination thereof.

The first device 102 can further be controlled or maneuvered without the direct user input 114 of FIG. 1 corresponding to the maneuver or the movement. For example, the first device 102 can include a self-driving vehicle, or a vehicle with automatic maneuvering features, such as smart cruise control or preventative breaking. The first device 102 can include a smart cruise control feature, capable of setting and adjusting the travel speed of the first device 102 without the direct user input 114. Also for example, the first device 102 can be controlled or maneuvered by the navigation system 100, including the navigation system 100 controlling or setting a cruising speed, lane position, or other physical maneuvers or movements of the first device 102.

The navigation system 100 can further utilize traffic flow state 109 from one or more vehicles or devices. The traffic state update 121 of FIG. 1 can include information regarding the traffic conditions observed by the first device 102. The traffic state update 121 can be an indication of the current conditions of the traffic in the region travelled by the first device 102.

The traffic state update 121 can further include information describing or representing surroundings or environment of the device or the vehicle reporting the traffic state update 121. For example, the traffic state update 121 can include speed data, navigation data, traffic data, or a combination thereof.

The first device 102 or other vehicles interfacing with the navigation system 100 can include a device, a circuit, one or more specific sensors, such as environmental sensors 210, or a combination thereof for providing assistance or additional information to the user 112 controlling, maneuvering, or operating the first device 102. The first device 102 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding first device 102 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the navigation system 100 or vehicle manufacturer, or a combination thereof.

The vehicle control circuit 206 can include a function unit or circuit integral to the first device 102 and configured to execute or implement instructions. The vehicle control circuit 206 can execute or implement the vehicle software to provide the intelligence of the corresponding vehicle, the navigation system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the corresponding vehicle, such as the first device 102, another vehicle, or a combination thereof. The vehicle communication circuit 204 can be configured to enable external communication to and from the corresponding vehicle. For example, the vehicle communication circuit 204 can permit the first device 102 to communicate with the second device 106 of FIG. 1.

The vehicle communication circuit 204 can also function as a communication hub allowing the corresponding control vehicle to function as part of the network 104 of FIG. 1 and not limited to be an end point or terminal circuit to the network 104. The vehicle communication circuit 204 can include active and passive components, such as microelectronics or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the second device 106 as end points of the communication, such as for direct line-of-sight communication or peer-to-peer communication. The vehicle communication circuit 204 can further couple with the network 104 to send or receive information through a server or another intermediate device in between endpoints of the communication.

The first device 102 or other vehicles can further include various interfaces. The first device 102 can include one or more interfaces for interaction or internal communication between functional units or circuits of the first device 102. For example, the first device 102 can include one or more interfaces, such as drivers, firmware, wire connections or buses, protocols, or a combination thereof, for the vehicle storage circuit 208, the vehicle control circuit 206, or a combination thereof.

The first device 102 or the other vehicles can further include one or more interfaces for interaction with an occupant, an operator or a driver, a passenger, or a combination thereof relative to the corresponding vehicle. For example, the first device 102 or the other vehicles can include a user interface 212 including input or output devices or circuits, such as a screen or touch screen, a speaker, a microphone, a keyboard or other input devices, an instrument panel, or a combination thereof.

The first device 102 can further include one or more interfaces along with switches or actuators for physically controlling movable components of the first device 102. For example, the first device 102 can include the one or more interfaces along with the controlling mechanisms to physically perform and control the maneuvering of the first device 102, such as for automatic driving, smart cruise control, or maneuvering features.

The functional units or circuits in the first device 102 can work individually and independently of the other functional units or circuits. The first device 102 can work individually and independently from the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the corresponding vehicle. The environmental sensors 210 can detect, identify, determine, or a combination thereof, such as for status, surroundings or movement for the corresponding vehicle. The environmental sensors 210 can detect, identify, determine, or a combination thereof for environment within a cabin of the corresponding vehicle, an environment external to and surrounding the corresponding vehicle, or a combination thereof. The environmental sensors 210 can be implement for the first device 102.

For example, the environmental sensors 210 can include a user interface 212, an optical sensor 214, a radar sensor 216, a location-movement sensor 218, or a combination thereof. The user interface 212 can include a projector, a video screen, a touch screen, a speaker, or any combination thereof. The user interface 212 can display the traffic flow state 109 of FIG. 1, a planned route, lane suggestions, speed warnings, vehicle system alerts and combinations thereof.

The optical sensor 110 can include a sensor for detecting or determining visual information representing the environment external to and surrounding of the corresponding vehicle. The optical sensor 110 can include a camera attached to or integral with the corresponding vehicle or device. For example, the optical sensor 110 can include a camera, such as forward facing camera, a video camera, a rear-view or back-up camera, a side-view or a blind-spot camera, or a combination thereof. Also, for example, the optical sensor 110 can include an infrared sensor, a night vision video camera, or a night vision sensor.

The optical sensor 110 can further include a camera on the first device 102 or another user device of the user 112 connected to and interacting with a vehicle. The optical sensor 110 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the corresponding device or vehicle, a relative location or a distance between the object or the target and the corresponding device or vehicle, or a combination thereof.

The radar sensor 216 can utilize radio waves to determine or identify an existence of the object or the target, the relative location or a distance relative to the first device 102 or other corresponding device or vehicle, or a combination thereof. For example, the radar sensor 216 can include a proximity sensor or warning system, such as for an area in front of, behind, adjacent to or on a side of, or a combination thereof geographically or physically relative to the first device 102.

The location-movement sensor 218 can be a sensor for identifying or calculating a geographic location of the corresponding vehicle or device, determining a movement or speed of the corresponding vehicle or device, or a combination thereof. The location-movement sensor 218 can include an accelerometer, a speedometer, a Global Positioning System (GPS) receiver or device, a gyroscope or a compass, or a combination thereof. The first device 102 can include the environmental sensors 210 other than or in addition to the location-movement sensor 218. The location-movement sensor 218 can provide a gyroscope rate of change for monitoring turns and a speed from the speedometer.

The navigation system 100 can use one or more of the optical sensors 110 corresponding to one or more devices, one or more vehicles, or a combination thereof to generate the traffic flow state 109 describing or representing information regarding the environment surrounding the corresponding device or vehicle. The traffic flow state 109 can be further processed with the vehicle control circuit 206, stored in the vehicle storage circuit 208, communicated to another device or vehicle through the vehicle communication circuit 204, or a combination thereof.

As a more specific example, the vehicle communication circuit 204, the vehicle control circuit 206, the vehicle storage circuit 208, the optical sensors 110, one or more interfaces, or a combination thereof can be included in or make up the first device 102.

The navigation system 100 can utilize the traffic flow state 109 from devices, vehicles, or a combination thereof to dynamically determine and map traffic and road conditions in a geographical area along with vehicles, pedestrians, objects, or a combination thereof within the geographical area. The navigation system 100 can further utilize the traffic flow state 109 to provide information to other vehicles near or planning to enter the region of the first device 102. As a more specific example, the navigation system 100 can use the traffic flow state 109 to dynamically locate and map vehicles on the road and provide look-ahead traffic information. The navigation system 100 can further utilize the traffic flow state 109 to control movement of the first device 102 at a lane level of granularity.

The navigation system 100 can provide the vehicle movement control 228 as a suggestion to the user 112 for maneuvering or operating the first device 102. Details regarding the utilization and processing of the traffic flow state 109 are discussed below.

The navigation system 100 can process and generate vehicle movement control 228 for controlling or maneuvering the first device 102. The vehicle movement control 228 is an instruction, a signal, a process, a method, a mechanism, or a combination thereof directing or controlling physical movement or travel of the first device 102.

The navigation system 100 can communicate the traffic state update 121 from the first device 102 to the second device 106 on fixed intervals, such as one minute intervals. For an illustrative example, the navigation system 100 supports the second device 106 conveying the traffic state update 121 from the first device 102 to other vehicles near or planning to enter the region reported by the first device 102.

Continuing with the example, the navigation system 100 can use the traffic flow state 109 generated or provided from the first device 102 without the user input 114. The navigation system 100 can utilize the traffic flow state 109 to provide information, assist maneuvering, control maneuvers, or a combination thereof for other vehicles near the first device 102.

Continuing with the example, the navigation system 100 can communicate the traffic state update 121 through the second device 106 to other devices or vehicles, or directly communicate to the other devices or vehicles, such as for a peer-to-peer communication system. The navigation system 100 can communicate the traffic state update 121 for informing other devices or vehicles of the location or status of the first device 102 itself, about other vehicles detected and identified around the first device 102, or a combination thereof.

As a more specific example, the navigation system 100 can use the traffic flow state 109 to generate the vehicle movement control 228, such as for steering, braking, setting or adjusting travel speed, accessary control, or a combination thereof. Details regarding the processing of the vehicle movement control 228 are discussed below.

Figure 3:
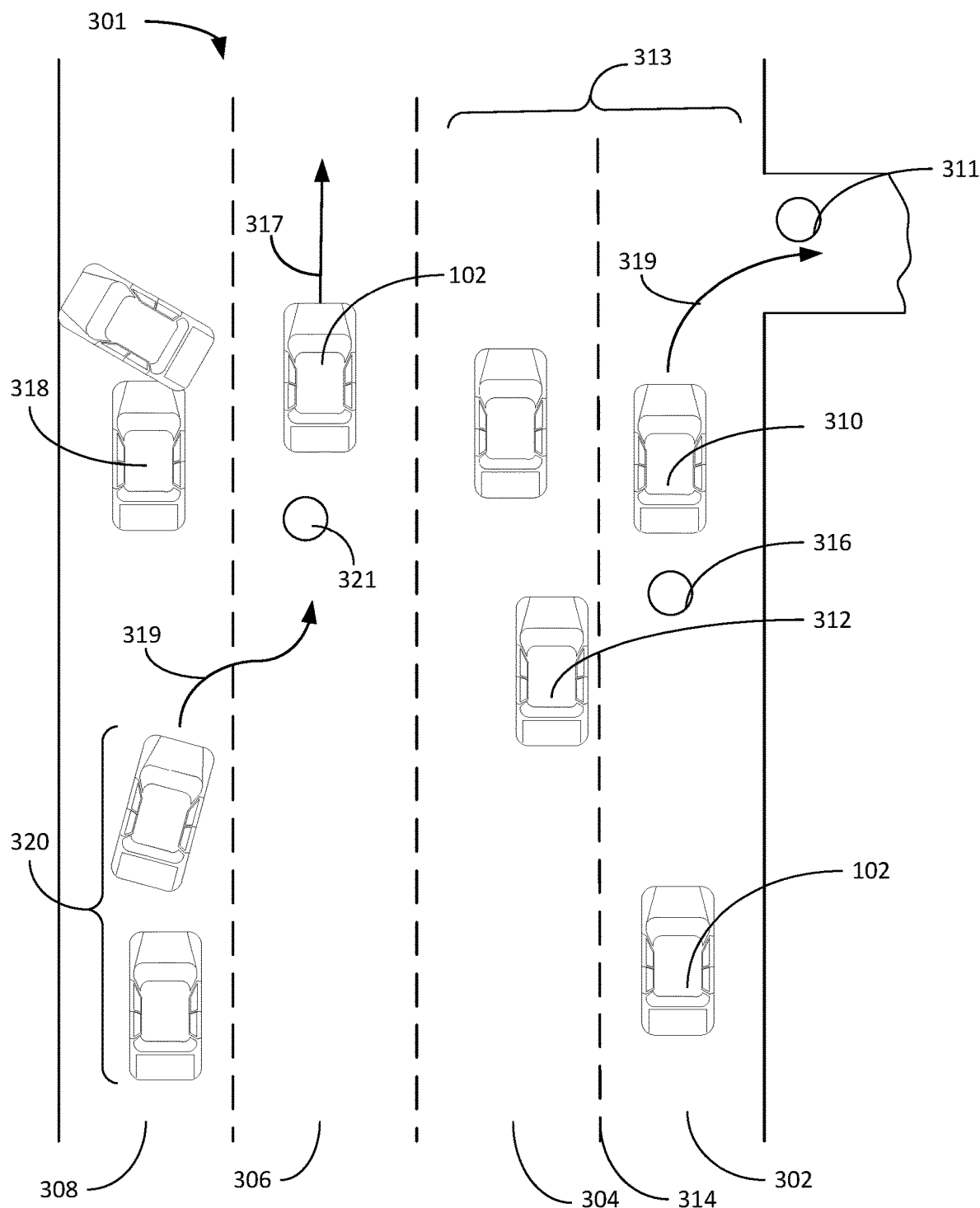
FIG. 3 is an exemplary overhead view of a region of travel as processed by the navigation system.

Referring now to FIG. 3, therein is shown an exemplary overhead view of a region of travel 301 as processed by the navigation system 100. The region of travel 301 can include traffic lanes, including a number 1 lane 302, a number 2 lane 304, a number 3 lane 306, and a number 4 lane 308. By way of an example, the first device 102 can be positioned in the number 1 lane 302 and approaching a first other vehicle 310, such as a slower vehicle, in the number 1 lane 302. The first device 102 can detect the traffic flow state as a congested traffic state 316, but the presence of an intersection 311 directly in front to the first other vehicle 310 can alter the detection of the traffic flow state 109 to a slow traffic state 321, because the first other vehicle 310 is entering a turn state 319 for the intersection 311, the traffic flow state 109 can be changed based on the presence of the intersection 311. If the planned route of the first device 102 is not intended to exit the highway in a short distance and there is no intersection in close proximity, this situation could be reported as the traffic flow state 109 classified as congested traffic.

Continuing the example, the presence of a second other vehicle 312 in the number 2 lane 304, that is close to a lane line 314, can be interpreted as the traffic flow state 109 being a congested traffic state 316 if the first other vehicle 310 and the second other vehicle 312 come to a near or complete stop in adjacent traffic lanes 313. The detection of the congested traffic state 316 can cause the first device 102 to change lanes to the left over to the number 3 lane 306, which would provide the traffic flow state 109 of a free traffic state 317 because there are no other vehicles within 100 meters in the number 3 lane 306. It is understood that the adjacent traffic lanes 313 are shown to be the number 1 lane 302 and the number 2 lane 304 as an example only and any number or combination of the number 1 lane 302, the number 2 lane 304, the number 3 lane 306, and the number 4 lane 308 that are divided by the lane line 314 are considered to be the adjacent lanes 313. It is further understood that the navigation system 100 does not need to identify or differentiate the number 1 lane 302, the number 2 lane 304, the number 3 lane 306, and the number 4 lane 308 and that they are identified for ease of description only.

In another example, the first device 102 could encounter a traffic accident 318 in the number 4 lane 308, which would cause the traffic flow state 109 to be interpreted as the congested traffic state 316. As the other vehicles 320 that are stuck behind the traffic accident 318 merge from the number 4 lane 308 to the number 3 lane 306, the traffic flow state 109, for the other vehicles 320, can be interpreted as a turning state 319. As the other vehicles 320 pass the traffic accident 318 they may slow down to less than half the posted speed limit, as provided by the background map database 124, in order to look at the damage, which can create a slow traffic state 321. It is understood that the examples provided are for ease of explanation and not to be used in a limiting basis, as other classifications of the traffic flow state 109 are expected.

It has been discovered that detection of the traffic flow state 109 can cause the first device 102 to respond to adjust the controls or display instructions for the user 112 of FIG. 1 of the first device 102 to maintain a safe position in the lane or change the position to a different lane. The first device 102 might decrease speed, increase speed, change lanes, or a combination thereof in order to safely proceed through the region of travel 301. By reporting the traffic state update 121 to the second device 106 of FIG. 1, a preparatory warning can be sent to other users entering or planning to enter the region of travel 301 of the first device 102. It will be understood by those skilled in the art that an early warning of the congested traffic state 316 or the traffic accident 318 can improve the safety for the first device 102 and the other vehicles 320 travelling through the region of travel 301.

Figure 4:
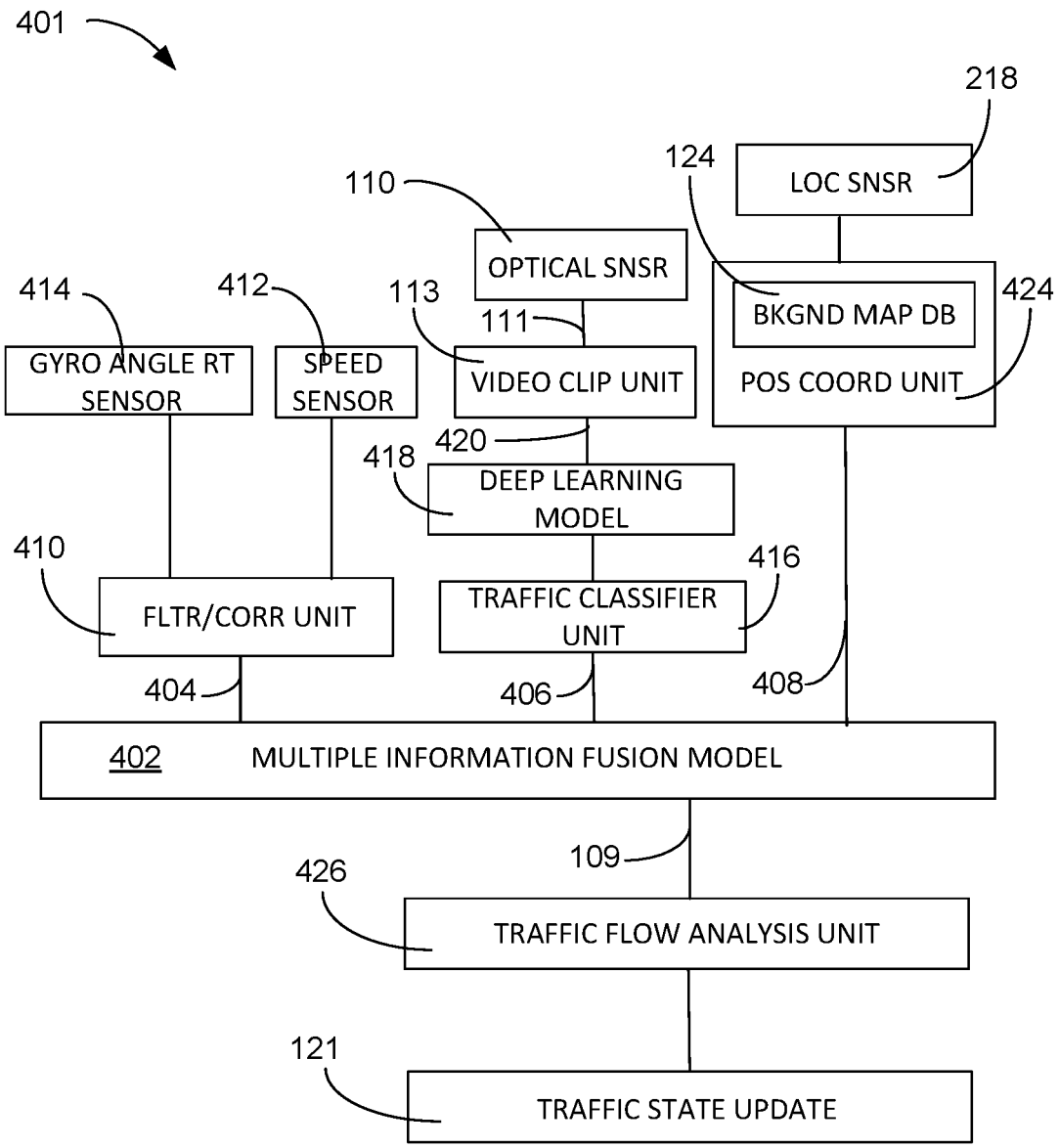
FIG. 4 is an exemplary functional block diagram of the traffic state detection mechanism of the navigation system.

Referring now to FIG. 4, therein is shown an exemplary block diagram of a multiple information fusion mechanism 401 of the navigation system 100 of FIG. 1. The exemplary block diagram of a multiple information fusion mechanism 401 depicts a multiple information fusion model 402 that can fuse a corrected speed 404, a traffic state estimate 406, and a distance to intersection 408. The multiple information fusion model 402 can be software running on specialized hardware or a dedicated hardware device capable of combining the corrected speed 404, the traffic state estimate 406, and the distance to intersection 408 in three second intervals to provide the traffic flow state 109.

The corrected speed 404 is provided by a filter correction unit 410 that monitors a speed sensor 412 of the first device 102 of FIG. 1 and a gyroscope angular rate sensor 414 provided by the location-movement sensor 218 of FIG. 2. The filter correction unit 410 can be software running on specialized hardware or a dedicated hardware circuit. The filter correction unit 410 can detect when the first device 102 is making a turn at the intersection 311 of FIG. 3 or on a highway. Since the output of the speed sensor 412 the first device 102 decreases for the turn could be interpreted as congested traffic state 316 of FIG. 3, the filter correction unit 410 monitors the gyroscope angular rate sensor 414. If the gyroscope angular rate sensor 414 exceeds five degrees per second, the filter correction unit 410 recognizes the turning state 319 of FIG. 3, which alerts the multiple information fusion model 402 to ignore the traffic state estimate 406 for the duration of the turning state 319.

The traffic state estimate 406 can be provided by a traffic classifier unit 416, which can be software running on a specific hardware or a dedicated hardware circuit. The traffic classifier unit 416 can receive the analysis of a deep learning model 418 based on a series of frames submitted by the video clip unit 113. The traffic classifier unit 416 can record the findings of the deep learning model 418 based on sampling a number of the frames captured in the video clip 420 to provide the traffic state estimate 406.

The deep learning model 418 can be software running on a specific hardware or a dedicated hardware circuit. The deep learning model 418 is a neural network of weighted interconnects and decision nodes that can analyze the sampled frames of video clips 420, received from video clip unit 113 that buffers the data from the optical sensor 110. During a training process of the deep learning model 418, the weighted interconnects, between the decision nodes, can be adjusted to allow the identification of the estimated traffic found in the video clips 420. The optical sensor 110 can provide the sensor data stream 111 to the video clip unit 113 for segmentation and buffering that produces the video clips 420 of a fixed duration, such as three seconds. The deep learning model 418 can be trained or updated to more efficiently identify traffic state from the video clips 420.

The multiple information fusion model 402 can receive the distance to intersection 408 of the first device 102 from the location-movement sensor 218. A position coordinate unit 424 can compare the background map database 124 with the location from the location-movement sensor 218 on short intervals, such as one second intervals, as the distance to intersection 408 of the first device 102. The multiple information fusion model 402 can perform an analysis, based on the distance to intersection 408 and the traffic state estimate 406 to identify the slow traffic state 321 of FIG. 3 that is close to the intersection 311 of FIG. 3.

By way of an example, when the first device 102 is approaching the intersection 311, the traffic flow state 109 can be easily mistaken as the congested traffic state 316. To evaluate the impact of the intersection 311, the background map database 124 and the position coordinates 424 can be utilized to qualify the traffic flow state 109. The distance to intersection 408 can provide the distance to the intersection 311 in the direction the first device 102 is travelling. Assuming that the traffic flow state 109 is identified as the congested traffic state 316, but the distance from the first device 102 to the intersection 311 meets a specific threshold, such as 100 meters, the traffic flow state 109 can be reset to the slow traffic state 321 of FIG. 3.

A traffic flow analysis unit 426 can monitor the traffic flow state 109 over a fixed period of time, such as one minute, in order to generate the traffic state update 121. The traffic state update 121 can be a compilation of the fixed intervals presented as the traffic flow state 109. The traffic flow analysis unit 426 can determine if a particular state or condition dominates for the fixed time interval between updates of the traffic state update 121 that is sent to the second device 106 of FIG. 1 for further distribution. The traffic flow analysis unit 426 can perform trend analysis by weighting the second half of the fixed time interval to be greater than the first half, or it can count the number of occurrences of the congested traffic state 321, the slow traffic state 316 of FIG. 3, and the free traffic state 317 of FIG. 3. By way of an example, a process such as binning, of the traffic flow state 109 over the fixed time interval can report the congested traffic state 316, the free traffic state 317, or the slow traffic state 321 that has the highest count. The traffic flow state 109 can include the congested traffic state 316, the free traffic state 317, or the slow traffic state 321 as a majority count or as a weighted average.

It has been discovered that the multiple information fusion mechanism 401 of the navigation system 100 can provide accurate and timely updates for the region of travel 301 of FIG. 3 of the first device 102. The short duration of the fixed time interval, such as one minute, allows the traffic state update 121 to provide a real-time analysis of the traffic conditions experienced by the first device 102 and the other vehicles 320. The traffic state update 121 can identify temporary or medium term blockages on the background map database 124, such as the traffic accident 318 of FIG. 3 or road construction (not shown) respectively. By sending the traffic state update 121 to the second device 106, the background map database 124 can be updated and verified. The second device 106 can forward the traffic state update 121 to the other vehicles 320 that are communicating with the navigation system 100. This communication can provide a safer and more efficient travel path through the region of travel 301 accessed by the first device 102.

Figure 5:
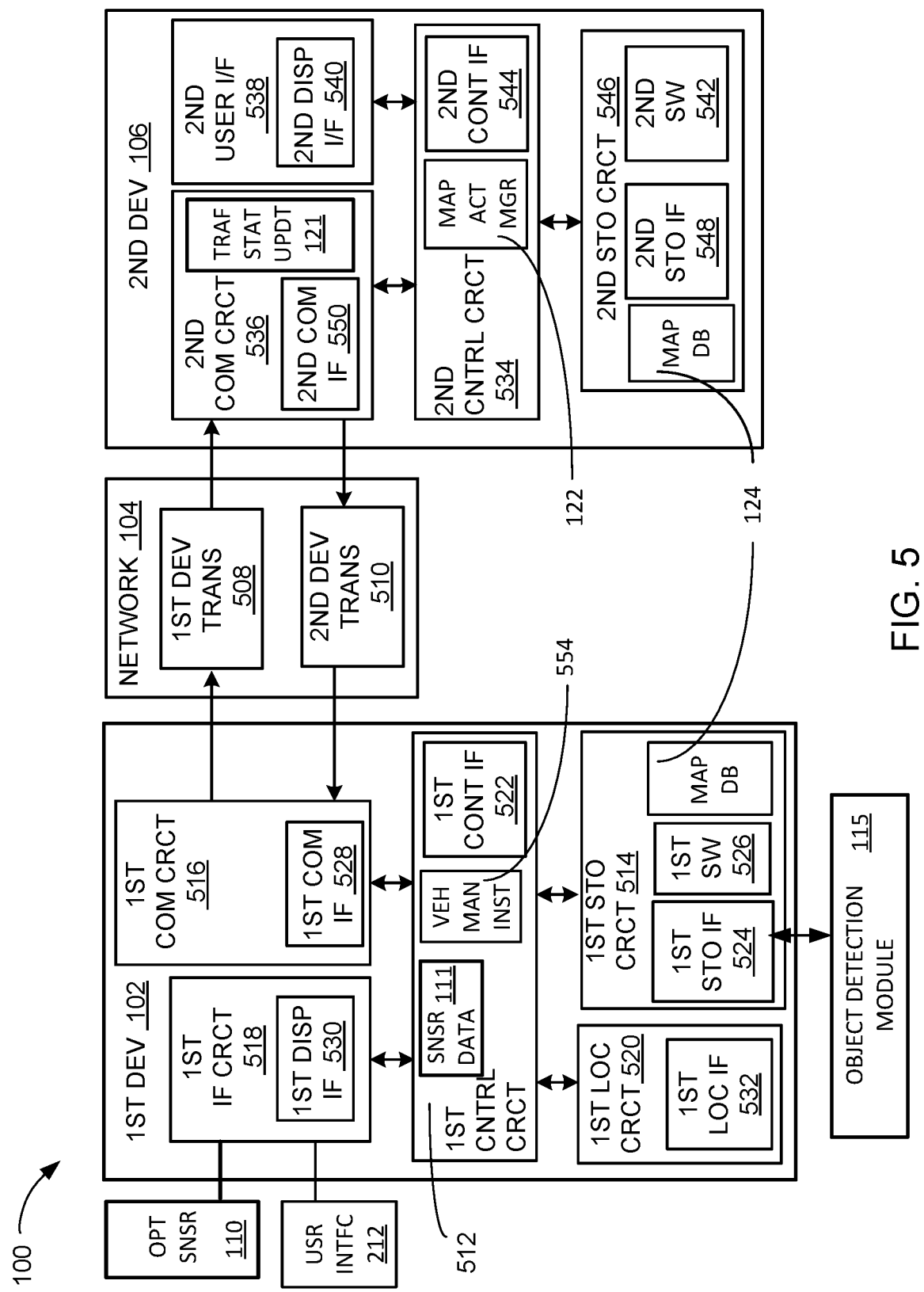
FIG. 5 is an exemplary block diagram of the navigation system in an embodiment.

Referring now to FIG. 5, therein is shown an exemplary block diagram of the navigation system 100 in an embodiment. The navigation system 100 can include the first device 102, the network 104, and the second device 106. The first device 102 can send information in a first device transmission 508 over the network 104 to the second device 106. The second device 106 can send information in a second device transmission 510 over the network 104 to the first device 102 or the other vehicles 320 of FIG. 3.

For illustrative purposes, the navigation system 100 is shown with the first device 102 as a client device, although it is understood that the navigation system 100 can include the first device 102 as a different type of device. For example, the first device 102 can be a server containing the first display interface 530 coupled to the user interface 212.

Also, for illustrative purposes, the navigation system 100 is shown with the second device 106 as a server, although it is understood that the navigation system 100 can include the second device 106 as a different type of device. For example, the second device 106 can be a client device. By way of an example, the navigation system 100 can be implemented entirely on the first device 102. The second device 106 can provide training and enhancement of the multilayer neural network 116 of FIG. 1.

Also, for illustrative purposes, the navigation system 100 is shown with interaction between the first device 102 and the second device 106. However, it is understood that the first device 102 can be a part of or the entirety of an autonomous vehicle, a smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first interface circuit 518, and a first location circuit 520. The first control circuit 512 can include a first control interface 522. The first control circuit 512 can execute a first software 526 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102, such as the sensor data local storage 108 of FIG. 1. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102. The first storage interface 524 can receive input from and source data to the traffic estimation module 115.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106 and the network 104.

The first communication circuit 516 can also function as a communication hub allowing the first device 102 to function as part of the network 104 and not limited to be an endpoint or terminal circuit to the network 104. The first communication circuit 516 can include active and passive components, such as microelectronics or an antenna, for interaction with the network 104.

The first communication circuit 516 can include a first communication interface 528. The first communication interface 528 can be used for communication between the first communication circuit 516 and other functional units or circuits in the first device 102. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first interface circuit 518 allows the user 112 of FIG. 1 to interface and interact with the first device 102. The first interface circuit 518 can include an input device and an output device. Examples of the input device of the first interface circuit 518 can include a keypad, a touchpad, soft-keys, a keyboard, a microphone, an infrared sensor for receiving remote signals, the optical sensor 110, or any combination thereof to provide data and communication inputs. By way of an example, the optical sensor 110 can connect to the first interface circuit 518 through a wired or wireless connection. The first interface circuit 518 can pass the input from the optical sensor 110 to the first control circuit 512 for processing and storage. During training of the traffic estimation module 115, the first communication interface 528 can transfer the input from the optical sensors 110, the location of the optical sensors 110, and the extrinsic parameters of the optical sensor 110 to the second device 106 to enhance the accuracy and reliability of the multilayer neural network 116 of FIG. 1, the object identifier 118 of FIG. 1, and the frame sampler module 120 of FIG. 1.

The first interface circuit 518 can include a first display interface 530. The first display interface 530 can include an output device. The first display interface 530 can couple the user interface 212 including a projector, a video screen, a touch screen, a speaker, a microphone, a keyboard, and combinations thereof.

The first control circuit 512 can operate the first interface circuit 518 to display information generated by the navigation system 100 and receive input from the user 112 of FIG. 1. The first control circuit 512 can also execute the first software 526 for the other functions of the navigation system 100, including receiving location information from the first location circuit 520. The first control circuit 512 can further execute the first software 526 for interaction with the network 104 via the first communication circuit 516. The first control unit 512 can operate the multiple information fusion model 402 of FIG. 4.

The first control circuit 512 can operate the first interface circuit 518 to collect data from the optical sensors 110. The first control circuit 512 can also receive location information from the first location circuit 520. The first control circuit 512 can operate the traffic estimation module 115 in order to deliver the traffic flow state 109 for display on the user interface 212 and generate the control guidance instructions and maneuvering instructions 554 to autonomously drive or assist in driving the first device 102. The maneuvering instructions 554 can include increase speed, decrease speed, lane change suggestions, lane boundary warnings, and traffic avoidance alerts. The maneuvering instructions 554 can be generated based on the position of the other vehicles 320, the content of the traffic flow state 109, and an occupancy of the adjacent lanes 313.

The first location circuit 520 can generate location information in the distance to intersection 408 of FIG. 4, by comparing the background map database 124 with the current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a gyroscope, or any combination thereof. Also, for example, the first location circuit 520 can utilize components such as an accelerometer, gyroscope, or global positioning system (GPS) receiver.

The first location circuit 520 can include a first location interface 532. The first location interface 532 can be used for communication between the first location circuit 520 and other functional units or circuits in the first device 102, including the optical sensor 110.

The first location interface 532 can receive information from the other functional units/circuits or from external sources, or can transmit information to the other functional units/circuits or to external destinations. The external sources and the external destinations refer to sources and destinations external to the first device 102.

The first location interface 532 can include different implementations depending on which functional units/circuits or external units/circuits are being interfaced with the first location circuit 520. The first location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows an operator (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

During the training process, the second control circuit 534 can receive the traffic state update 121 through the second communication circuit 536. The second control circuit 536 can verify the content of the traffic state update 121 does indeed represent traffic flow that was identified by the location of the first device 102, by examining the traffic state estimate 406 of FIG. 4, the distance to intersection 408 of the optical sensor 110, and the extrinsic parameters of the optical sensor 110. Once the traffic state update 121 has been verified, the second control circuit 534 can transfer the traffic state update 121 through the second storage circuit 546 to the map activity manager 122 for processing and further distribution.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

The second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514. During the training process the second storage circuit 546 can receive the traffic state update 121 of the region of travel 301 for the first device 102. The second storage circuit 546 can pass the traffic state update 121 to incorporate updates to the background map database 124, the real-time traffic model 126, and the hazardous warning model 128 sent in real-time by the first device 102. The traffic state update 121 can then be passed through the second communication circuit 536 for transmission to the other vehicles 320 of FIG. 3 to aid in lane selection, route planning or alternate route planning.

For illustrative purposes, the second storage circuit 546 is shown as a single element, although it is understood that the second storage circuit 546 can be a distribution of storage elements. Also, for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM).

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544. The second storage circuit 546 can receive real world updates for the background map database 124 from the traffic state update 121 received from the traffic estimation module 115 in the first device 102.

The second communication circuit 536 can enable external communication to and from the second device 106. For example, the second communication circuit 536 can permit the second device 106 to communicate with the first device 102 over the network 104. By way of an example, the second device 106 can provide the traffic state update 121 to the other vehicles 320 that are in or near the region of travel 301 of the first device 102.

The second communication circuit 536 can also function as a communication hub allowing the second device 106 to function as part of the network 104 and not limited to be an endpoint or terminal unit or circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

During the training process the first communication circuit 516 can couple with the network 104 to send the traffic state update 121 to the second device 106 in the first device transmission 508. The second device 106 can receive information in the second communication circuit 536 from the first device transmission 508 of the network 104.

The second communication circuit 536 can couple with the network 104 to send information to the first device 102, including the updates for the traffic estimation module 115 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

By way of a further example, the first device 102 can be the autonomous vehicle or the driver assisted vehicle. The first interface circuit 518 can receive input from the optical sensor 110 of FIG. 1, for compiling the traffic state update 121. The traffic state update 121 can be generated by the first control circuit 512 from the optical sensor 110 and the first location circuit 520. The traffic state update 121 can be sent through the first communication circuit 516 and the network 104 to the second device 106 for processing by the second control circuit 534 and the map activity manager 122.

It has been discovered that the second device 106 can receive the traffic state update 121 from the first device 102 that provides updates for the map activity manager 122. As an example, the second control circuit 534 can verify the traffic state update 121 and pass the information to the map activity manager 122 for analysis. When the map activity manager 122 has analyzed the data and updated the background map database 124, the real-time traffic model 126, and the hazardous warning model 128, the second control unit 534 can generate safety warnings and lane suggestions for the other vehicles 320 travelling in the region of travel 301 of the first device 102. The real-time distribution of traffic warnings and lane suggestions can improve safety, reduce delays, and conserve energy by minimizing back-ups and plotting alternate routes around the traffic accident 318 of FIG. 3.

Figure 6:
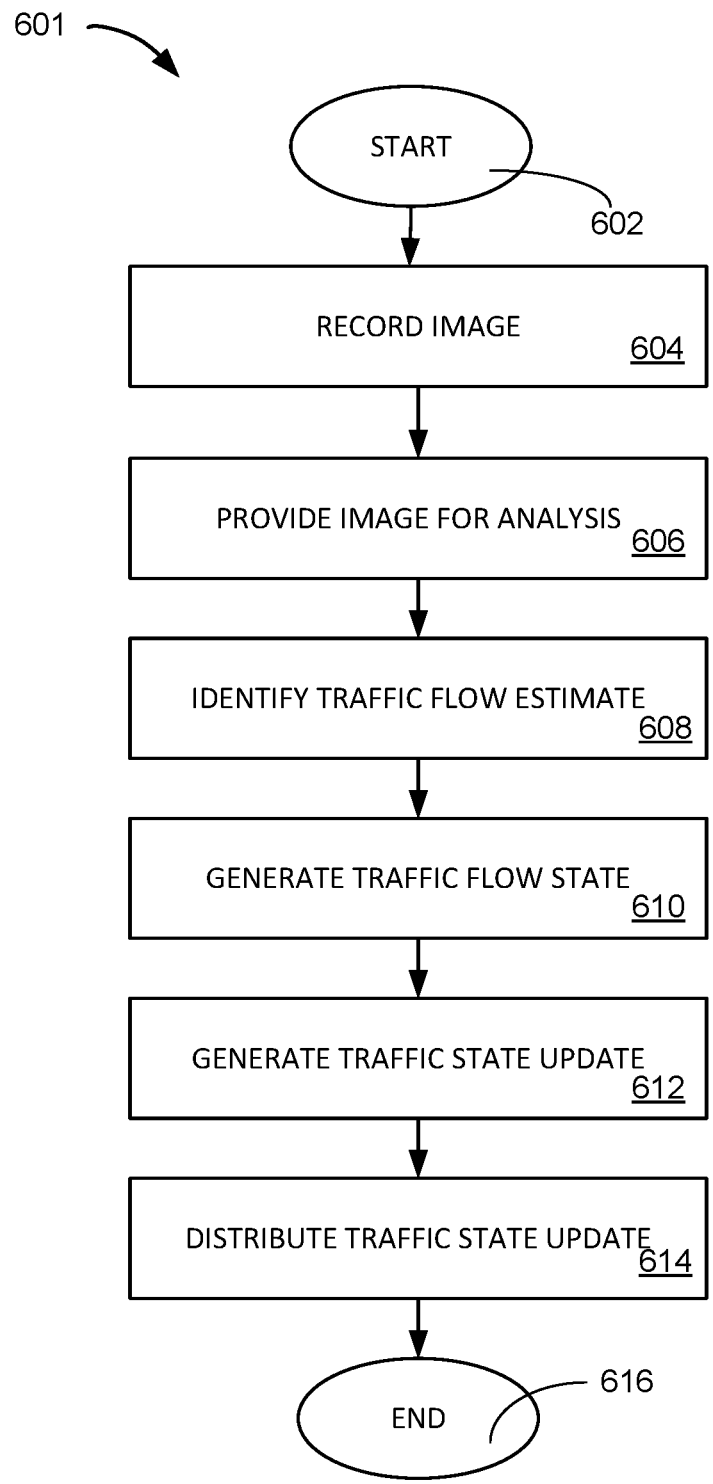
FIG. 6 is exemplary operational flow chart of the navigation system.

Referring now to FIG. 6, therein is shown an exemplary operational flow chart 601 of the navigation system 100 of FIG. 1 in an embodiment of the present invention. The exemplary operational flow chart 601 of the navigation system 100 depicts a start block 602 indicating that the first device 102 of FIG. 1 has accessed a region of travel 301 of FIG. 3. The flow proceeds to a record image block 604 in which the optical sensor 110 of FIG. 1 of the first device 102 records the region of travel 301. The first control circuit 512 of FIG. 5 can identify the current global location by accessing the first location circuit 520 of FIG. 2 for incorporation in the sensor data stream 111 of FIG. 1. It is understood that the current global location can indicate the actual location of the optical sensor 110 of the first device 102. The first control circuit 512 can generate extrinsic parameters of the optical sensor 110 in order to facilitate the analysis of the sensor data stream 111.

The flow proceeds to a provide image of analysis block 606, in which the sensor data stream 111 is split into the video clips 420 of FIG. 4 and analyzed by the deep learning model 418 of FIG. 4 of the first device 102. It is understood that the second device 106 can have more data processing capability and speed than the first device 102, so for training purposes the processing of the sensor data stream 111 could be performed by the second device 106 and after the deep learning model 418 has been trained, the analysis can be performed by the first device 102.

The flow proceeds to an identify traffic flow estimate block 608. Here, the deep learning model 418 can analyze the image from the video clips 420 of FIG. 4 and identify the traffic flow estimate 406 from the sampled video clips 420. By way of an example, the traffic flow estimate 406 can be determined to be the congested traffic state 316, the free traffic state 317, or the slow traffic state 321. The deep learning model 418 can process the images taken from the video clips 420 to provide the traffic flow estimate to the multiple information fusion model 402 of FIG. 2.

The flow then proceeds to a generate traffic flow state block 610. The multiple information fusion model 402 can qualify the traffic flow estimate 406 with the distance to intersection 408 of FIG. 4 and the corrected speed 404 of FIG. 4. If the corrected speed 404 detects a turn state 319 of FIG. 3, the traffic flow estimate 406 is ignored for the duration of the turn state 319. If the turn state 319 is not detected, but the distance to intersection 408 indicates that the intersection 311 of FIG. 3 is in close proximity, the traffic flow estimate 406 can be modified from the congested traffic state 316 to the slow traffic state 321.

The flow then proceeds to a generate traffic state update block 612. The traffic flow analysis unit 426 can monitor the occurrence of the congested traffic state 316, the free traffic state 317, or the slow traffic state 321 to determine a prominent state. The traffic flow analysis unit 426 can count the occurrence of the congested traffic state 316, the free traffic state 317, or the slow traffic state 321 to determine which of the states provided the greater number of events during a fixed period, such as one minute. The congested traffic state 316, the free traffic state 317, or the slow traffic state 321 representing the greatest number would be reflected for the full period as the traffic state update 121.

The flow can then proceed to a distribute traffic state update block 614. The first control circuit 512 can assemble the traffic flow state 109 and generate a set of maneuvering instructions 554 of FIG. 5 for the first device 102 to progress through the region of travel 301 of FIG. 3. The first control circuit 512 can merge the traffic flow state 109 and the set of maneuvering instructions 554 for display on the user interface 212. The first control circuit 512 can send the traffic flow state 109 and the maneuvering instructions 554 to the first display interface 530 of FIG. 5 for presenting on the user interface 212. The first control circuit 512 can also transfer the traffic flow state 109 through the network 104 of FIG. 1 to the second device 106 of FIG. 1 as the traffic state update 212 for distribution to the other vehicles 320 of FIG. 3

The flow proceeds to an end 616, in which the first device 102 can generate the traffic state update 121, present it on the user interface 212 of FIG. 2. It is understood that the user interface 212 can show the sensor data stream 111 of the region of travel 301 and the traffic state update 121 can be presented as a highlighted overlay, or the traffic state update 121 can be presented on the user interface 212 by itself. The first device 102 can extract the maneuvering instructions 554 from the traffic flow state 109 in order to enable the driver assisted or autonomous driving features of the first device 102 to safely progress through the region of travel 301.

Figure 7:
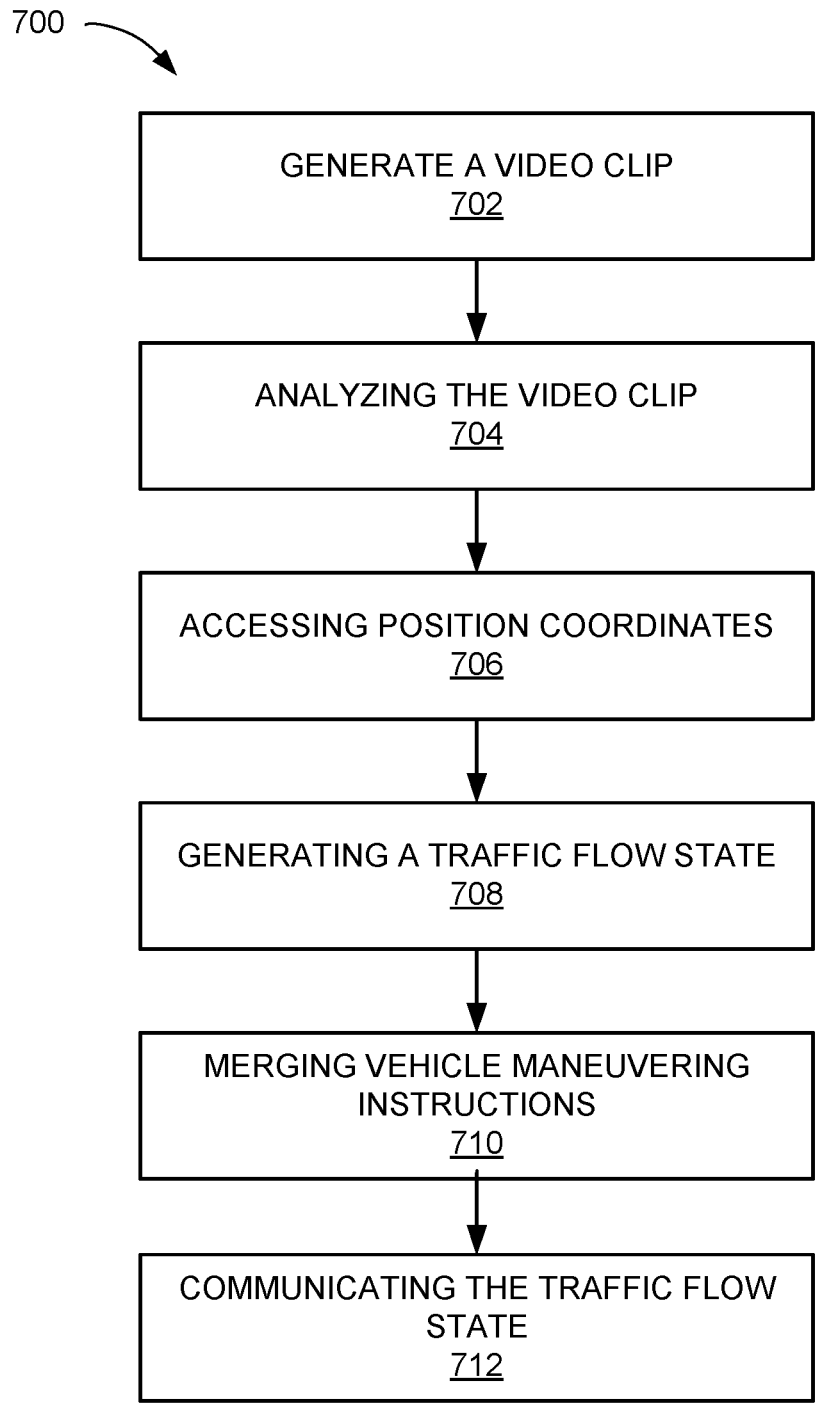
FIG. 7 is a flow chart of a method of operation of a navigation system in an embodiment of the present invention.

Referring now to FIG. 7, therein is shown a flow chart of a method 700 of operation of a navigation system 100 of FIG. 1 in an embodiment of the present invention. The method 700 includes: generating a video clip by parsing an interval of a sensor data stream for a region of travel in a block 702; analyzing the video clip submitted to a deep learning model, already trained, including identifying a traffic flow estimate a block 704; accessing a position coordinate for calculating a distance to intersection in a block 706; generating a traffic flow state by fusing a corrected speed, a traffic flow estimate, and the distance to intersection in a block 708; merging a vehicle maneuvering instruction into the traffic flow state for maneuvering through the region of travel in a block 710; and communicating the traffic flow state for displaying on a device in a block 712.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising: a control circuit configured to: generate a video clip by parsing an interval of a sensor data stream for a region of travel; analyze the video clip submitted to a deep learning model, already trained, including identifying a traffic flow estimate; access a position coordinate for calculating a distance to intersection; generate a traffic flow state by fusing a corrected speed, the traffic flow estimate, and the distance to intersection; merge a vehicle maneuvering instruction into the traffic flow state for maneuvering through the region of travel; and a communication circuit, coupled to the control circuit, configured to: communicate the traffic flow state for displaying on a device.

2. The system as claimed in claim 1 wherein the control circuit is configured to: generate the corrected speed by submitting a speed and a gyroscope angular rate to a filter/correction unit; and detect a turning state when the speed is decreasing and the gyroscope angular rate exceeds 5 degree per second.

3. The system as claimed in claim 1 wherein the control circuit is configured to load the traffic flow estimate in a multiple information fusion model to detect a free traffic state when a distance to a vehicle in a same traffic lane is 100 meters or more.

4. The system as claimed in claim 1 wherein the control circuit is configured to detect a slow traffic state when a multiple information fusion model identifies other vehicles travelling at less than half of a posted speed limit provided by a background map database.

5. The system as claimed in claim 1 wherein the control circuit is configured to detect a congested traffic state when a multiple information fusion model identifies a vehicle travelling in an adjacent traffic lane that comes to a near or complete stop.

6. The system as claimed in claim 1 wherein the control circuit is configured to generate a traffic state update by compiling the traffic flow state over a fixed period of time including counting an occurrence of a congested traffic state, a slow traffic state and a free traffic state.

7. The system as claimed in claim 1 wherein the control circuit is configured to generate the vehicle maneuvering instruction based on the position of a vehicle and an occupancy of an adjacent lane.

8. The system as claimed in claim 1 wherein the communication circuit is configured to send a traffic state update, through a network for updating a background map database, a real-time traffic model, and a hazardous warning model.

9. A method of operation for a navigation system comprising: generating a video clip by parsing an interval of a sensor data stream for a region of travel; analyzing the video clip submitted to a deep learning model, already trained, including identifying a traffic flow estimate; accessing a position coordinate for calculating a distance to intersection; generating a traffic flow state by fusing a corrected speed, the traffic flow estimate, and the distance to intersection; merging a vehicle maneuvering instruction into the traffic flow state for maneuvering through the region of travel; and communicating the traffic flow state for displaying on a device.

10. The method as claimed in claim 9 further compromising: generating the corrected speed by submitting a speed and a gyroscope angular rate to a filter/correction unit; and detecting a turning state when the speed is decreasing and the gyroscope angular rate exceeds 5 degree per second.

11. The method as claimed in claim 9 further comprising loading the traffic flow estimate in a multiple information fusion model for detecting a free traffic state when a distance to a vehicle in a same traffic lane is 100 meters or more.

12. The method as claimed in claim 9 further comprising detecting a slow traffic state when a multiple information fusion model identifies other vehicles travelling at less than half of a posted speed limit provided by a background map database.

13. The method as claimed in claim 9 further comprising detecting a congested traffic state when a multiple information fusion model identifies a vehicle travelling in an adjacent traffic lane coming to a near or complete stop.

14. The method as claimed in claim 9 further comprising generating a traffic state update by compiling the traffic flow state over a fixed period of time including counting an occurrence of a congested traffic state, a slow traffic state and a free traffic state.

15. A non-transitory computer readable medium including instructions for a navigation system comprising: generating a video clip by parsing an interval of a sensor data stream for a region of travel; analyzing the video clip submitted to a deep learning model, already trained, including identifying a traffic flow estimate; accessing a position coordinate for calculating a distance to intersection; generating a traffic flow state by fusing a corrected speed, the traffic flow estimate, and the distance to intersection; merging a vehicle maneuvering instruction into the traffic flow state for maneuvering through the region of travel; and communicating the traffic flow state for displaying on a device.

16. The non-transitory computer readable medium including the instructions as claimed in claim 15 further compromising: generating the corrected speed by submitting a speed and a gyroscope angular rate to a filter/correction unit; and detecting a turning state when the speed is decreasing and the gyroscope angular rate exceeds 5 degree per second.

17. The non-transitory computer readable medium including the instructions as claimed in claim 15 further comprising loading the traffic flow estimate in a multiple information fusion model for detecting a free traffic state when a distance to a vehicle in a same traffic lane is 100 meters or more.

18. The non-transitory computer readable medium including the instructions as claimed in claim 15 further comprising detecting a slow traffic state when a multiple information fusion model identifies the vehicle travelling at less than half of a posted speed limit provided by a background map database.

19. The non-transitory computer readable medium including the instructions as claimed in claim 15 further comprising detecting a congested traffic state when a multiple information fusion model identifies a vehicle travelling in an adjacent traffic lane coming to a near or complete stop.

20. The non-transitory computer readable medium including the instructions as claimed in claim 15 further comprising generating a traffic state update by compiling the traffic flow state over a fixed period of time including counting an occurrence of a congested traffic state, a slow traffic state and a free traffic state.

\* \* \* \* \*